United States Patent
Nakayama et al.

(10) Patent No.: US 10,440,897 B2
(45) Date of Patent: Oct. 15, 2019

(54) GRAFTING METHOD

(71) Applicant: NATIONAL AGRICULTURE AND FOOD RESEARCH ORGANIZATION, Tsukuba-shi, Ibaraki (JP)

(72) Inventors: Natsuki Nakayama, Saitama (JP); Keita Yoshinaga, Tsukuba (JP); Loan Thi Thanh Nguyen, Saitama (JP)

(73) Assignee: NATIONAL AGRICULTURE AND FOOD RESEARCH ORGANIZATION, Tsukuba-shi (JP)

(*) Notice: Subject to any disclaimer, the term of this patent is extended or adjusted under 35 U.S.C. 154(b) by 157 days.

(21) Appl. No.: 15/557,917

(22) PCT Filed: Oct. 14, 2015

(86) PCT No.: PCT/JP2015/079058
§ 371 (c)(1),
(2) Date: Sep. 13, 2017

(87) PCT Pub. No.: WO2016/147458
PCT Pub. Date: Sep. 22, 2016

(65) Prior Publication Data
US 2018/0042183 A1 Feb. 15, 2018

(30) Foreign Application Priority Data
Mar. 19, 2015 (JP) .................... 2015-056453

(51) Int. Cl.
*A01G 2/30* (2018.01)
*B29C 65/08* (2006.01)

(52) U.S. Cl.
CPC ............ *A01G 2/30* (2018.02); *B29C 65/08* (2013.01); *B29K 2995/0026* (2013.01)

(58) Field of Classification Search
CPC .................................. A01G 2/30; A01G 2/35
See application file for complete search history.

(56) References Cited

U.S. PATENT DOCUMENTS 3,050,905 A * 8/1962 Vlaeminck .............. A01G 2/30
47/6
2009/0260745 A1 10/2009 Iwai et al.

FOREIGN PATENT DOCUMENTS

| BE | 581821 A | 2/1960 |
|----|----------|--------|
| JP | 63-37923 A | 2/1988 |
| JP | 3-58718 A | 3/1991 |

(Continued)

OTHER PUBLICATIONS

Office Action dated Oct. 9, 2018, issued in counterpart Japanese Application No. 2015-056453, with English translation. (6 pages).
Naver blog, URL:https://blog.naver.com/soongdo82/90110307268, Mar. 30, 2011; with English translation of the related part; cited in Korean Office Action dated Sep. 17, 2018. (24 pages).

(Continued)

Primary Examiner — Monica L Williams
Assistant Examiner — Aaron M Rodziwicz
(74) Attorney, Agent, or Firm — Westerman, Hattori, Daniels & Adrian, LLP

(57) ABSTRACT

A grafting method includes: making a cut surface of a scion and a cut surface of a rootstock contact with each other, and disposing sheet-like thermoplastic resin films facing each other across a contact part; and covering a periphery of the contact part with the thermoplastic resin films by ultrasonically welding the thermoplastic resin films.

10 Claims, 9 Drawing Sheets

(56) References Cited

FOREIGN PATENT DOCUMENTS

| | | |
|---|---|---|
| JP | 4-183326 A | 6/1992 |
| JP | 5-8299 A | 1/1993 |
| JP | 5-30856 A | 2/1993 |
| JP | 7-203764 A | 8/1995 |
| JP | 2004-159518 A | 6/2004 |
| JP | 2005-143332 A | 6/2005 |
| JP | 2009-65928 A | 4/2009 |
| JP | 2009-255407 A | 11/2009 |
| JP | 2012-205547 A | 10/2012 |
| JP | 2013-184734 A | 9/2013 |
| JP | 2015-12831 A | 1/2015 |
| KR | 10-2010-0044582 A | 4/2010 |
| WO | 94/14314 A1 | 7/1994 |
| WO | WO-9414314 A1 * | 7/1994 ............... A01G 2/30 |

OTHER PUBLICATIONS

Office Action dated Sep. 17, 2018, issued in counterpart Korean Application No. 10-2017-7026190, with English translation. (6 pages).
Database WPI Week 199308 Thomson Scientific, London, GB; AN 1993-061347 XP002777877, Abstract; cited in Extended (supplementary) European Search Report dated Mar. 19, 2018. (2 pages).
Extended (supplementary) European Search Report dated Mar. 19, 2018, issued in counterpart European Application No. 15885550.2. (9 pages).
International Search Report dated Nov. 24, 2015, issued in counterpart International Application No. PCT/JP2015/079058 (2 pages).
Office Action dated May 14, 2019, issued in counterpart JP application No. 2015-056453, with English translation. (10 pages).

* cited by examiner

FIG. 5A

| No. | TENSILE LOAD | FIRST EXPERIMENT | SECOND EXPERIMENT | THIRD EXPERIMENT | FOURTH EXPERIMENT |
|---|---|---|---|---|---|
| 1 | 1.0 N | — | — | 100% | 100% |
| 2 | 1.4 N | — | — | 100% | 100% |
| 3 | 2.0 N | 95% | 100% | 100% | 100% |
| 4 | 2.5 N | 100% | 100% | 100% | 100% |
| 5 | 3.3 N | — | — | 100% | 95% |
| 6 | 4.0 N | — | — | 100% | 100% |

FIG. 5B

| | FIRST EXPERIMENT | SECOND EXPERIMENT | THIRD EXPERIMENT | FOURTH EXPERIMENT |
|---|---|---|---|---|
| TUBE | 95% | 100% | 95% | 100% |

FIG. 5C

| | FIRST EXPERIMENT | SECOND EXPERIMENT | THIRD EXPERIMENT | FOURTH EXPERIMENT |
|---|---|---|---|---|
| DIAMETER OF SCION (mm) | 1.62 | 1.44 | 1.66 | 1.83 |
| DIAMETER OF ROOTSTOCK (mm) | 1.69 | 1.61 | 1.59 | 1.82 |

FIG. 6A

| No. | TENSILE LOAD | PULLOUT LOAD | PEELING OR DROPPING AFTER TWO WEEKS | IN PROCESS OF PEELING OR DROPPING AFTER TWO WEEKS |
|---|---|---|---|---|
| 1 | 1.0 N | 0.45 | | |
| 2 | 1.4 N | 0.54 | | |
| 3 | 2.0 N | 0.87 | 5% | 95% |
| 4 | 2.5 N | 0.97 | 20% | 80% |
| 5 | 3.3 N | 1.14 | 5% | 95% |
| 6 | 4.0 N | 0.97 | 25% | 75% |

FIG. 6B

| | PULLOUT LOAD | PEELING OR DROPPING AFTER TWO WEEKS | IN PROCESS OF PEELING OR DROPPING AFTER TWO WEEKS |
|---|---|---|---|
| TUBE | 0.88 | 20% | — |

FIG. 8A

| No. | TENSILE LOAD | SUCCESS RATE |
|---|---|---|
| 0 | 0.0 N | 100% |
| 1 | 1.0 N | 100% |
| 2 | 1.4 N | 100% |
| 3 | 2.0 N | 100% |
| 4 | 2.5 N | 100% |
| 5 | 3.3 N | 100% |
| 6 | 4.0 N | 100% |

FIG. 8B

| | |
|---|---|
| DIAMETER OF SCION (mm) | 1.93 |
| DIAMETER OF ROOTSTOCK (mm) | 2.10 |

GRAFTING METHOD

TECHNICAL FIELD

The present invention relates to a grafting method.

BACKGROUND ART

As a countermeasure against soilborne pathogen and a measure to increase a yield, grafting has been increasingly used worldwide. A tube or an elastic cylindrical body (see Patent Documents 1 and 2 or the like), a clip (see Patent Document 3 or the like), an adhesive tape (see Patent Documents 4 through 6 or the like), heat-shrinkable plastic (see Patent Document 7 or the like), and stretch non-woven cloth (see Patent Document 8 or the like) have been conventionally used as a joint material for joining a rootstock and a scion in grafting.

PRIOR ART DOCUMENT

Patent Document

[Patent Document 1] Japanese Patent Application Publication No. 2009-65928
[Patent Document 2] Japanese Patent Application Publication No. 7-203764
[Patent Document 3] Japanese Patent Application Publication No. 2012-205547
[Patent Document 4] Japanese Patent Application Publication No. 4-183326
[Patent Document 5] Japanese Patent Application Publication No. 2004-159518
[Patent Document 6] Japanese Patent Application Publication No. 3-58718
[Patent Document 7] Japanese Patent Application Publication No. 5-30856
[Patent Document 8] Japanese Patent Application Publication No. 2005-143332

SUMMARY OF THE INVENTION

Problems to be Solved by the Invention

However, when a tube or an elastic cylindrical body is used, it is necessary to prepare several tubes or several elastic cylindrical bodies having diameters appropriate to the shaft diameters of the rootstock and the scion, and select appropriate one. Thus, there are concerns that the cost increases and the working man-hour increases.

When a clip is used, the weight of the clip may cause a grafted plant to fall down, or the strong pinching force of the clip may damage the plant. In addition, because of the structure of the clip, the visibility of the joined part of the rootstock and the scion is poor.

When an adhesive tape is used, since adhesive agents are used, the adhesive agents may fail to function because trichomes are sandwiched between the tapes when used to a nursery plant such as a tomato plant having trichomes around its hypocotyl. In addition, when the joined part has water, or during nurturing process under high humidity after grafting, the adhesive agents may fail to function.

When heat-shrinkable plastic is used, since heating treatment is necessary, there is a concern that the heat affects the nursery plant. When stretch non-woven cloth is used, since the non-woven cloth has ventilation characteristics and water retention characteristics, a scion root grows from the scion, and efficient symphysis after grafting may be prevented.

The present invention aims to provide a grafting method capable of maintaining the joined state of a scion and a rootstock at low cost.

Means for Solving the Problems

A grafting method of the present invention is a grafting method including: making a cut surface of a scion and a cut surface of a rootstock contact with each other, and disposing sheet-like thermoplastic resin films facing each other across a contact part; and covering a periphery of the contact part with the thermoplastic resin films by ultrasonically welding the thermoplastic resin films.

In this case, the disposing of the sheet-like thermoplastic resin films facing each other may include interposing the contact part between a first part and a second part that face each other when a single thermoplastic resin film is folded. Alternatively, the disposing of the sheet-like thermoplastic resin films facing each other may include interposing the contact part between two thermoplastic resin films facing each other. Additionally, the disposing of the sheet-like thermoplastic resin films facing each other may include applying a predetermined tensile load in a direction intersecting with axis directions of the scion and the rootstock and a direction in which the thermoplastic resin films face each other, and the covering may include ultrasonically welding the thermoplastic resin films applied with the predetermined tensile load. Furthermore, the thermoplastic resin films may be transparent.

Effects of the Invention

The grafting method of the present invention maintains the joined state of a scion and a rootstock at low cost.

BRIEF DESCRIPTION OF THE DRAWINGS

FIG. 5A through FIG. 5C are diagrams (No. 1) for describing a grafting experiment;
FIG. 6A and FIG. 6B are diagrams (No. 2) for describing the grafting experiment;
FIG. 8A and FIG. 8B are diagrams for describing the grafting experiment in accordance with the variation.

MODES FOR CARRYING OUT THE INVENTION

Hereinafter, an exemplary embodiment of a grafting method will be described in detail based on FIG. 1 through FIG. 6B.

Figure 1:
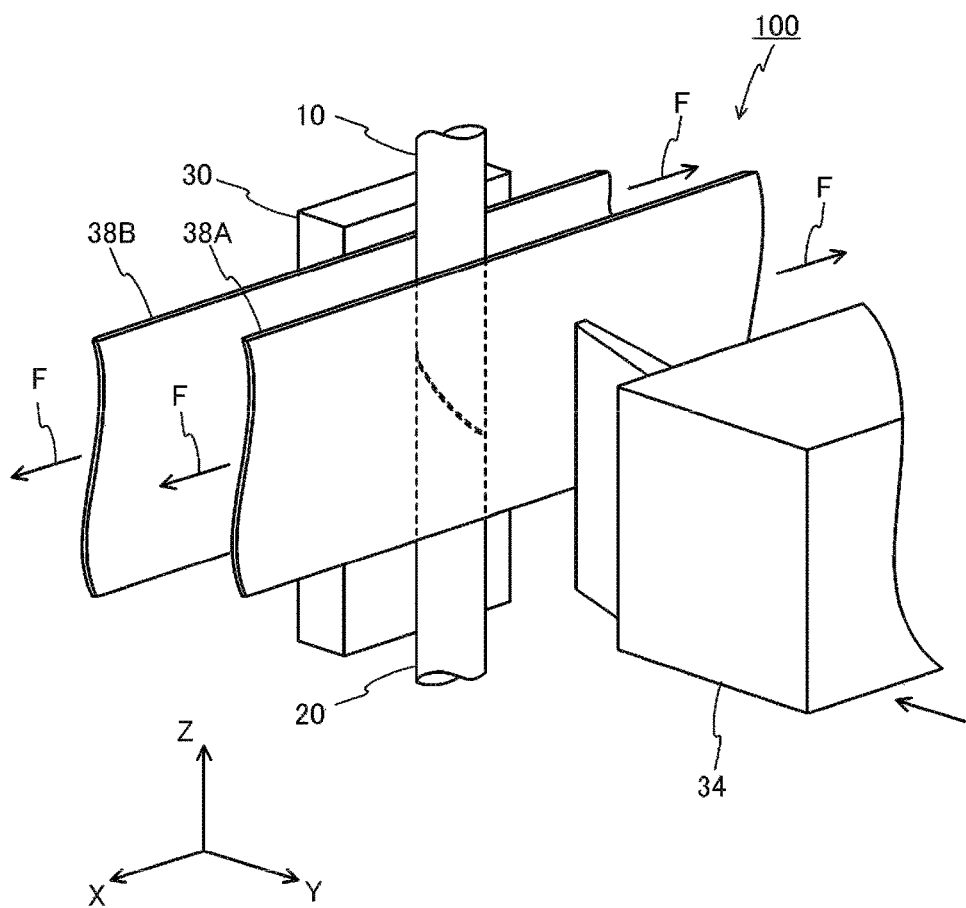
FIG. 1 schematically illustrates a structure of a grafting device in accordance with an exemplary embodiment.

FIG. 1 schematically illustrates a structure of a grafting device 100 for achieving the grafting method of the present embodiment. The grafting device 100 in FIG. 1 includes an ultrasonic welder 34 and a pressing member 30. Sheet-like thermoplastic resin films 38A and 38B as a joint material for grafting are arranged between the ultrasonic welder 34 and the pressing member 30.

As the thermoplastic resin films 38A and 38B, employed is elasticized resin, for example, resin with a tensile strength of 300 to 700 kg/cm² and a tensile elongation of 300 to 700%. More specifically, as the thermoplastic resin films 38A and 38B, employed is resin such as thermoplastic polyurethane elastomer, thermoplastic polyurethane, vinyl chloride, polyvinyl alcohol, polystyrene, or polypropylene. The material and the physical properties of the thermoplastic resin film 38A may be the same as or different from the material and the physical properties of the thermoplastic resin film 38B, respectively. The thermoplastic resin films 38A and 38B are transparent sheet-like members having a longitudinal direction in the X-axis direction in FIG. 1 and being thin in thickness in the Y-axis direction (e.g., having a thickness of 0.28 mm). The dimensions of the thermoplastic resin films 38A and 38B in the Z-axis direction are, for example, 10 mm. The thermoplastic resin films 38A and 38B are arranged leaving a predetermined interval in the Y-axis direction, and a tensile load F is applied to each of the thermoplastic resin films 38A and 38B in the X-axis direction (a first direction). The tensile load F is, for example, 1.0 N or greater, and the sum of the tensile loads applied to the two thermoplastic resin films 38A and 38B is 2.0 N or greater. At the time of grafting, a scion 10 and a rootstock 20 to be grafted are arranged between the thermoplastic resin films 38A and 38B along the Z-axis direction (a second direction) as illustrated in FIG. 1. The lower end (the −Z side end) of the scion 10 and the upper end (the +Z side end) of the rootstock 20 are cut diagonally, and the cut surfaces are in contact with each other in the state illustrated in FIG. 1.

The ultrasonic welder 34 is a device that welds the thermoplastic resin films 38A and 38B by sandwiching the thermoplastic resin films 38A and 38B between the ultrasonic welder 34 and the pressing member 30. The ultrasonic welder 34 applies fine ultrasonic vibrations and a pressure to the thermoplastic resin films 38A and 38B, thereby instantly melting the thermoplastic resin films 38A and 38B by frictional heat generated between the thermoplastic resin films 38A and 38B to bond them. The ultrasonic welding allows the thermoplastic resin films 38A and 38B to be welded in a short time equal to or less than one second. In addition, since the frictional heat is used, the welding is possible without being affected by surrounding temperature conditions and trichomes or water around the stems of the scion 10 and the rootstock 20. Additionally, in the ultrasonic welding, two thermoplastic resin films are welded by heat generated from the contact face between the two thermoplastic resin films. Thus, the thermoplastic resin films can be welded with a small amount of heat, and the temperature of the ultrasonic welder hardly rises. Thus, the scion 10 and the rootstock 20 are hardly thermally affected.

A grafting procedure will be described based on FIG. 2A through FIG. 4B. In the present description, a case where grafting is conducted manually by a worker will be described.

Figure 2A:
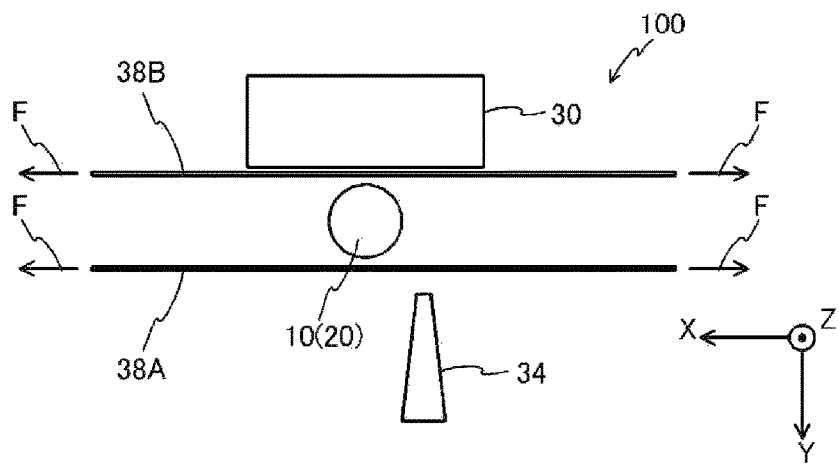
FIG. 2A through FIG. 2C are diagrams (No. 1) for describing a grafting method.

FIG. 2A through FIG. 3B illustrate the grafting device 100 viewed from the Z-axis direction. When grafting, a worker arranges the scion 10 and the rootstock 20 between the thermoplastic resin films 38A and 38B to which the tensile load F is applied in the X-axis direction while the scion 10 and the rootstock 20 are being joined (while the cut surfaces of the scion 10 and the rootstock 20 are in contact with each other) as illustrated in FIG. 2A. That is, a part where the scion 10 and the rootstock 20 are in contact with each other is interposed between the thermoplastic resin films 38A and 38B facing each other. Since the thermoplastic resin films 38A and 38B are transparent, the worker is able to visually check whether the scion 10 and the rootstock 20 are appropriately joined from the thermoplastic resin film 38A side.

Figure 2B:
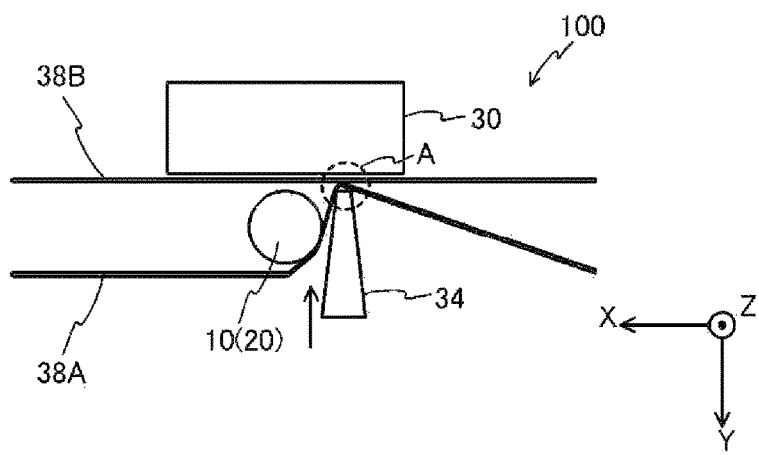

Then, the worker sets a −X side position near the scion 10 and the rootstock 20 as a target position to be welded, and moves the ultrasonic welder 34 in the −Y direction (moves the ultrasonic welder 34 close to the thermoplastic resin film 38A, and presses the ultrasonic welder 34 against the thermoplastic resin film 38A) as illustrated in FIG. 2B. This process causes the thermoplastic resin films 38A and 38B to be sandwiched between the ultrasonic welder 34 and the pressing member 30 and be applied with fine ultrasonic vibrations and a pressure. Thus, the thermoplastic resin films 38A and 38B are welded at the position indicated by a dashed line circle A in FIG. 2B. The welded part has a width of approximately 1 mm in the X-axis direction, and has a linear shape extending in the Z-axis direction.

Figure 2C:
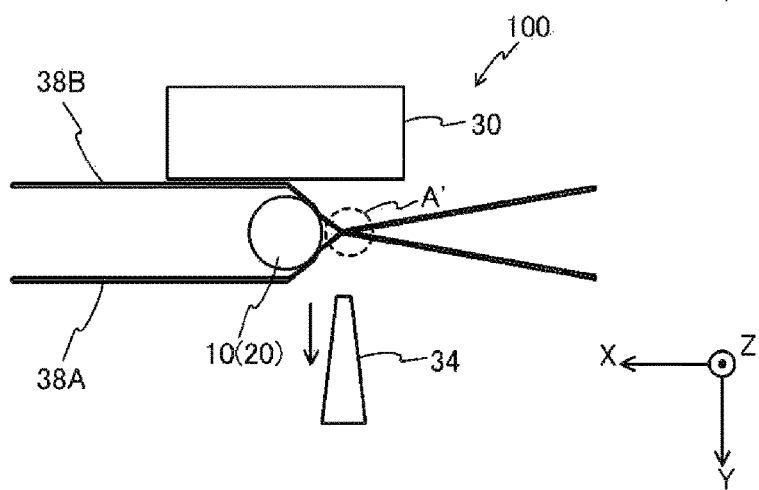

Then, the worker moves the ultrasonic welder 34 in the +Y direction as illustrated in FIG. 2C. In this case, since the tensile load F is applied to the thermoplastic resin films 38A and 38B, the welded part moves to a position A' in FIG. 2C.

Figure 3A:
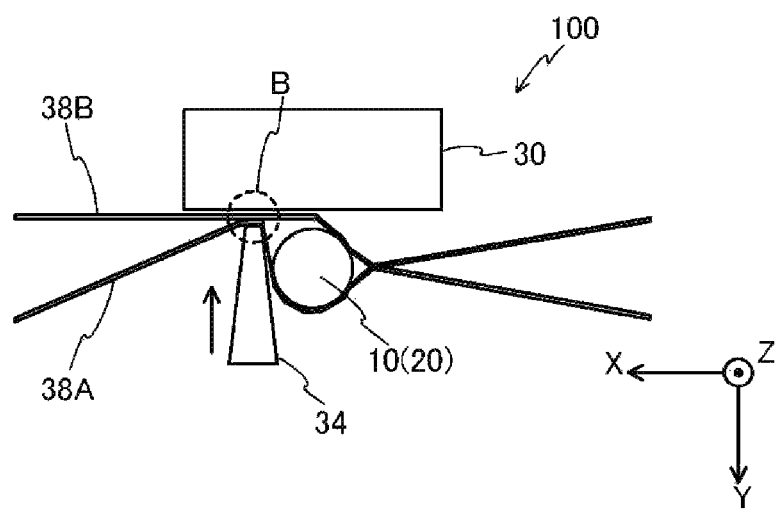
FIG. 3A and FIG. 3B are diagrams (No. 2) for describing the grafting method.

Then, the worker sets a +X side position near the scion 10 and the rootstock 20 as a target position to be welded, and moves the ultrasonic welder 34 in the −Y direction (moves the ultrasonic welder 34 close to the thermoplastic resin film 38A, and presses the ultrasonic welder 34 against the thermoplastic resin film 38A) as illustrated in FIG. 3A. This process causes the thermoplastic resin films 38A and 38B to be sandwiched between the ultrasonic welder 34 and the pressing member 30 and be applied with fine ultrasonic vibrations and a pressure. Thus, the thermoplastic resin films 38A and 38B are welded at the position indicated by a dashed line circle B in FIG. 3A.

Figure 3B:
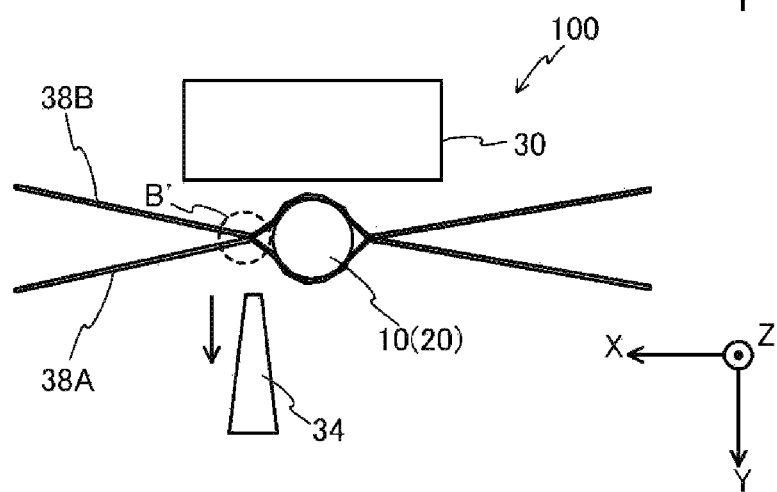

Then, the worker moves the ultrasonic welder 34 in the −Y direction as illustrated in FIG. 3B. In this case, since the tensile load F is applied to the thermoplastic resin films 38A and 38B, the welded part moves to a position B' in FIG. 3B.

Figure 4A:
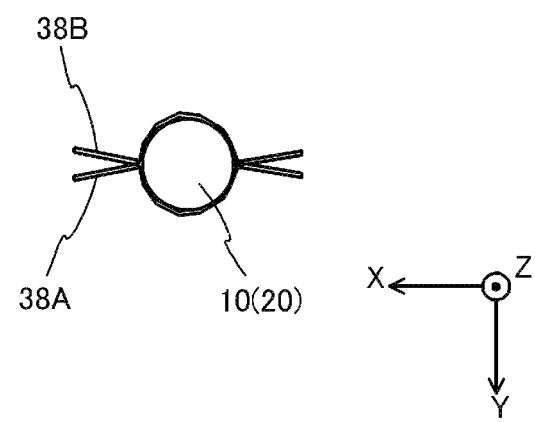
FIG. 4A illustrates a state after grafting viewed from a +Z direction.
Figure 4B:
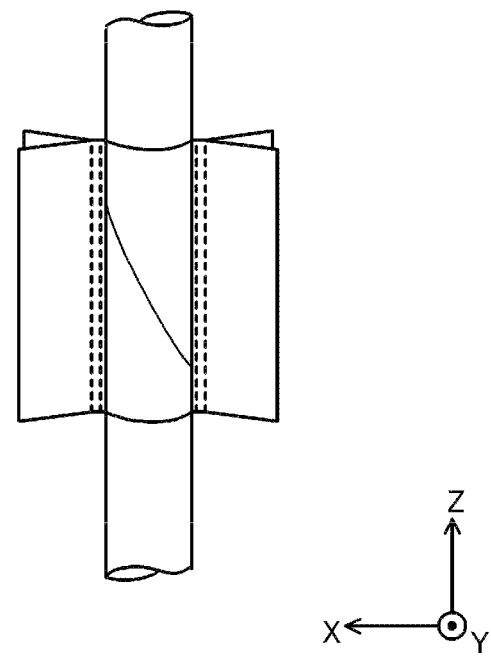
FIG. 4B illustrates the state after grafting viewed from a +Y direction.

Then, the worker cuts the thermoplastic resin films 38A and 38B at positions located a predetermined distance away from the scion 10 and the rootstock 20 in the +X direction and the −X direction as illustrated in FIG. 4A. FIG. 4B illustrates the state of FIG. 4A viewed from the +Y direction. In this case, since the thermoplastic resin films 38A and 38B are cut while being applied with the tensile load F, the thermoplastic resin films 38A and 38B shrink when they are cut. The pressure-bonding force caused by the shrinkage causes the thermoplastic resin films 38A and 38B to tightly contact with the scion 10 and the rootstock 20. Thus, the state where the scion 10 and the rootstock 20 are joined (the state where the scion 10 and the rootstock 20 are in contact with each other) is maintained.

Here, the state of the welded part obtained by ultrasonically welding the thermoplastic resin films 38A and 38B with the tensile load F being applied to the thermoplastic resin films 38A and 38B as described above differs from the state of the welded part obtained by ultrasonically welding the thermoplastic resin films 38A and 38B with no tensile load F being applied. For example, when the tensile load F is applied, bubbles originally existing in the thermoplastic resin film is expanded in the tensile direction, and thus, the welded part appears white-colored. In addition, when the tensile load F is applied, the boundary between the welded part and the remaining part becomes uneven. Thus, it is possible to determine whether the thermoplastic resin films 38A and 38B were welded while being applied with the tensile load F by observing the welded part and the vicinity thereof.

In addition, the state of the welded part obtained by ultrasonically welding the thermoplastic resin films 38A and 38B differs from the state of the welded part obtained by thermal welding. Generally, in thermal welding, a heater with a heater wire covered with non-woven cloth or woven cloth is used to prevent the thermoplastic resin films from being melted by heat and adhering to the heater wire. Thus, when thermal welding is conducted, the marks of the non-woven cloth or the woven cloth are left in the welded part regardless of the presence or absence of the tensile load F. On the other hand, when ultrasonic welding is conducted, the marks of the non-woven cloth or the woven cloth are not left in the welded part. Thus, it is possible to determine whether the thermoplastic resin films 38A and 38B were ultrasonically welded or thermally welded by observing the welded part.

A description will next be given of a tangible experiment (grafting experiment example).

FIG. 5A is a table listing the success rate (the percentage of rootage) in four grafting experiments that used the grafting device 100 of the present embodiment to graft a scion and a rootstock having diameters (in average) presented in FIG. 5C. Here, the success rate (the percentage of rootage) means the ratio of successful grafting, i.e., unwithered plants, when two weeks has passed after the grafting operation. In the grafting experiments of FIG. 5A, used as a joint material was thermoplastic polyurethane elastomer (made by Nisshinbo Chemical Inc., tensile strength: 400 kg/cm$^2$, tensile elongation: 400%). The tensile load in FIG. 5A means the tensile load (in total) applied to two thermoplastic resin films. FIG. 5B is a table listing the success rate (the percentage of rootage) when the scions and the rootstocks in FIG. 5C were grafted by using a tube as a joint material (for four experiments).

As presented in FIG. 5A, it is revealed that the grafting experiments using the grafting device 100 of the present embodiment can obtain the same results as the grafting experiments using the tube illustrated in FIG. 5B (the success rate (the percentage of rootage) of 95% or greater) regardless of the diameters of the scions and the rootstocks and the magnitude of the tensile load (from 1.0 N to 4.0 N). It should be noted that the pressure-bonding force did not affect the grafted nursery plant. In addition, in the grafting experiment, time required for welding was very short, 0.4 second.

The table in FIG. 6A lists measurement results of the pullout load (the load necessary to pullout the scion in the state where the rootstock was fixed immediately after welding) when the grafting device 100 of the present embodiment was used for grafting. The table in FIG. 6A also lists measurement results of the ratio of the joint material (the thermoplastic resin films 38A and 38B) that peeled or dropped from the grafted nursery plant after two weeks had passed from grafting and the ratio of the joint material that was in the process of peeling or dropping from the grafted nursery plant after two weeks had passed from grafting. FIG. 6B is a table when a tube was used as a joint material, and corresponds to FIG. 6A. The peeling of the joint material means a state where the joint material does not cover the grafted nursery plant but is caught on the trichome of the grafted nursery plant, while the dropping of the joint material means a state where the joint material has fallen from the grafted nursery plant. In addition, the joint material that is in the process of peeling or dropping means a state where the peeling of the welded part has started.

In this example, six graftings with different tensile loads (the sum of the tensile loads applied to two thermoplastic resin films) were conducted. The diameter (in average) of the scions was 1.92 (mm), and the diameter (in average) of the rootstocks was 1.84 (mm).

FIG. 6A and FIG. 6B reveal that the pullout load is made to be approximately equal to (approximately 0.88 N) or greater than that of the tube by setting the tensile load approximately equal to or greater than 2.0 N. When the tensile load is 2.0 N or greater, the probability of the thermoplastic resin films 38A and 38B peeling or dropping after two weeks as the nursery plant grows is 5 to 25%, and the probability of the thermoplastic resin films 38A and 38B being in the process of peeling or dropping is estimated to be 75% or greater. Thus, it is revealed that the work for removing the unnecessary thermoplastic resin films 38A and 38B after grafting is reduced.

The joint material (thermoplastic polyurethane elastomer) used for the grafting experiments was approximately 20 mm per grafted nursery plant. The unit price of the material is approximately 0.2 yen/10 mm. Thus, the cost necessary for grafting one grafted nursery plant is 1 yen or less. Thus, the cost is lowered compared to using a tube (2 to 3 yen/piece) or a clip (7 yen/piece).

As described above, the present embodiment makes the scion 10 and the rootstock 20 joined (makes the cut surfaces contact with each other), sandwiches the joined part between the sheet-like thermoplastic resin films 38A and 38B (FIG. 2A), and covers the periphery of the joined part with the thermoplastic resin films 38A and 38B by ultrasonically welding the thermoplastic resin films 38A and 38B with use of the ultrasonic welder 34 (FIG. 2B through FIG. 3B). By conducting grafting using ultrasonic welding in the above described manner, the joined state of the scion and the rootstock is maintained at low cost. More specifically, since ultrasonic welding uses frictional heat, grafting is conducted without being affected by surrounding temperature conditions and trichomes and water around the scion 10 and the rootstock 20 compared to using a tape using adhesive agents as a joint material. Additionally, since ultrasonic welding does not need a large amount of heat for shrinking plastic unlike using heat-shrinkable plastic as a joint material, there is no thermal effect on the scion 10 and the rootstock 20, and time required for welding can be shortened (for example, one second or less). Additionally, since ultrasonic welding does not use adhesive agents, even during the control under high humidity after grafting, the peeling due to the effect of the humidity does not easily occur, and the joined state is stably maintained. In addition, when a tube is used as a joint material, to handle scions and rootstocks with various diameters (shaft diameter), several tubes with different sizes need to be prepared, and a tube with an appropriate size needs to be selected. In contrast, the present embodiment can handle various scions and rootstocks by using the thermoplastic resin films 38A and 38B. In addition, since the thermoplastic resin films 38A and 38B are light in weight, compared to using a clip as a joint material, the effect of the weight of the joint material on the scion and the rootstock is reduced. Furthermore, by covering the joined part of a scion and a rootstock with the thermoplastic resin films 38A and 38B, unlike using non-woven cloth having ventilation characteristics and water retention characteristics as a joint material, the occurrence of the situation that a scion root grows from the scion and the joined state of the grafted plant thereby becomes incomplete is reduced.

In addition, the present embodiment sandwiches the joined part of a scion and a rootstock between two thermoplastic resin films 38A and 38B to which the tensile load is being applied in the X-axis direction, and then ultrasonically welds the thermoplastic resin films 38A and 38B applied with the tensile load. This process allows the state where the scion 10 and the rootstock 20 are joined to be maintained when the tensile load is released after welding (when the thermoplastic resin films 38A and 38B are cut as illustrated in FIG. 4A and FIG. 4B) because the thermoplastic resin films 38A and 38B tightly contact with the scion 10 and the rootstock 20 by the elastic forces (the contractile forces) of the thermoplastic resin films 38A and 38B. In this case, the present embodiment is effective especially when the scion 10 and the rootstock 20 have complicated shapes or when the diameter of the scion 10 differs from that of the rootstock 20. By ultrasonically welding the thermoplastic resin films 38A and 38B while the tensile load is being applied to the thermoplastic resin films 38A and 38B, the thermoplastic resin films 38A and 38B after welding are made to tightly contact with the scion 10 and the rootstock 20 even when the ultrasonic welder 34 is not moved so close to the scion 10 and the rootstock 20. This improves the workability of the worker.

In the present embodiment, since the thermoplastic resin films 38A and 38B are transparent, the worker is able to visually check whether the scion 10 and the rootstock 20 are joined with appropriate positional relation from the thermoplastic resin film 38A side. This improves the workability of the worker.

In the present embodiment, the thermoplastic resin films 38A and 38B have a tensile strength of 300 to 700 kg/cm$^2$ and a tensile elongation of 300 to 700%. Thus, the thermoplastic resin films 38A and 38B appropriately shrink when they are cut as illustrated in FIG. 4A and FIG. 4B, and tightly contact with the scion 10 and the rootstock 20. In addition, at the time of grafting, by applying a tensile load of 2.0 N or greater to the two thermoplastic resin films 38A and 38B, the scion 10 and the rootstock 20 are fixed with approximately the same force as that of using a tube.

Figure 7A:
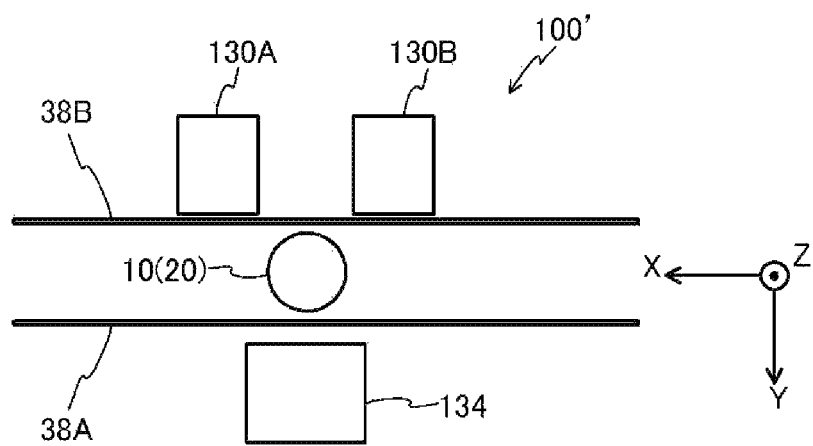
FIG. 7A through FIG. 7C are diagrams (No. 1) illustrating a variation of the grafting device.
Figure 7B:
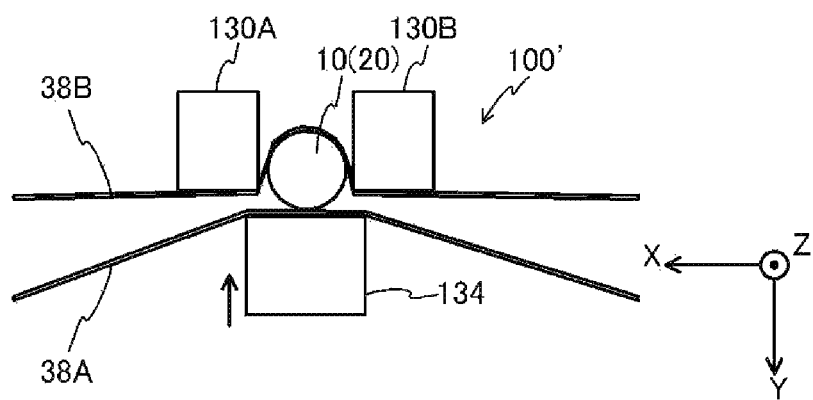
Figure 7C:
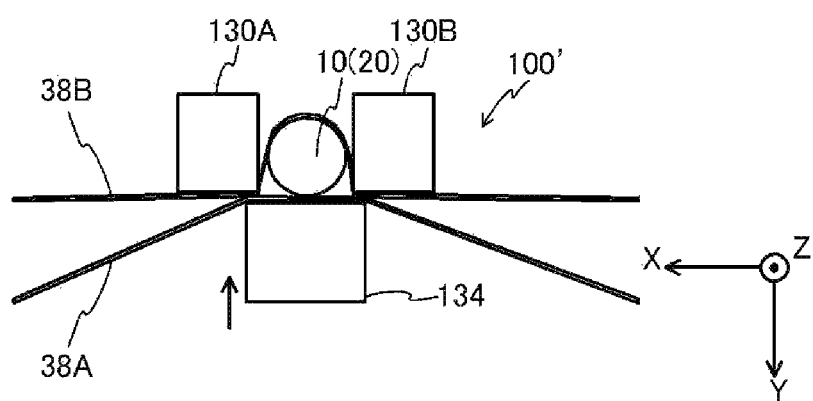

The above embodiment describes an exemplary case where the grafting device 100 illustrated in FIG. 2A is used, but does not intend to suggest any limitation. For example, as with a grafting device 100' illustrated in FIG. 7A, instead of the pressing member 30 illustrated in FIG. 2A, two pressing members 130A and 130B separated by a distance equal to or greater than the diameters of the scion 10 and the rootstock 20 in the X-axis direction may be provided. In this case, as an ultrasonic welder, used is a device (an ultrasonic welder 134 illustrated in FIG. 7A) with a larger welding range (the width in the X-axis direction) than the ultrasonic welder 34 illustrated in FIG. 2A. In this case, as illustrated in FIG. 7B and FIG. 7C, by moving the ultrasonic welder 134 in the −Y direction once, the thermoplastic resin films 38A and 38B can be welded at two locations at the +X side and the −X side of the scion 10 and the rootstock 20. Accordingly, the thermoplastic resin films 38A and 38B are welded together in short time and with less working step.

The above embodiment describes an exemplary case where the thermoplastic resin films 38A and 38B are ultrasonically welded while being applied with a tensile load, but does not intend to suggest any limitation. For example, the thermoplastic resin films 38A and 38B may be ultrasonically welded without being applied with a tensile load. FIG. 8A is a table listing the success rate (the percentage of rootage) in a grafting experiment that grafted the scion and the rootstock having diameters (in average) presented in FIG. 8B. In the grafting experiment of FIG. 8A, as in the grafting experiments of FIG. 5A, used as a joint material was thermoplastic polyurethane elastomer (made by Nisshinbo Chemical Inc., tensile strength: 400 kg/cm$^2$, tensile elongation: 400%). As presented in the table of FIG. 8A, even when a tensile load is not applied (tensile load=0.0 N), the success rate (the percentage of rootage) of the grafting experiment was 100%. When the tensile load was 0.0 N, the pullout load (the load necessary to pullout the scion in the state where the rootstock is fixed immediately after welding) was 0.18 N.

The above embodiment describes a case where the thermoplastic resin films 38A and 38B are ultrasonically welded while a tensile load is being applied to each of the thermoplastic resin films 38A and 38B, but does not intend to suggest any limitation. For example, the thermoplastic resin films 38A and 38B may be ultrasonically welded while a tensile load is being applied to only one of the thermoplastic resin films 38A and 38B, for example. In addition, the magnitudes of tensile loads applied to the thermoplastic resin films 38A and 38B may be different. In this case, when the sum of the tensile loads applied to the thermoplastic resin films 38A and 38B is 2.0 N, the pullout load is 0.87 N as presented in FIG. 6A. When the sum of the tensile loads is 2.5 N, the pullout load is 0.97 N as presented in FIG. 6A.

In the above embodiment, the two thermoplastic resin films 38A and 38B may be made to overlap (be in contact with each other), the scion 10 and the rootstock 20 may be interposed between the two thermoplastic resin films 38A and 38B, and then the thermoplastic resin films 38A and 38B may be welded. In this case, even when a tensile load is not applied to the thermoplastic resin films 38A and 38B in advance, a tensile load becomes applied to the thermoplastic resin films 38A and 38B by the insertion of the scion 10 and the rootstock 20.

The above embodiment describes an exemplary case where the thermoplastic resin films 38A and 38B are transparent, but does not intend to suggest any limitation. The thermoplastic resin films 38A and 38B may be opaque.

Figure 9A:
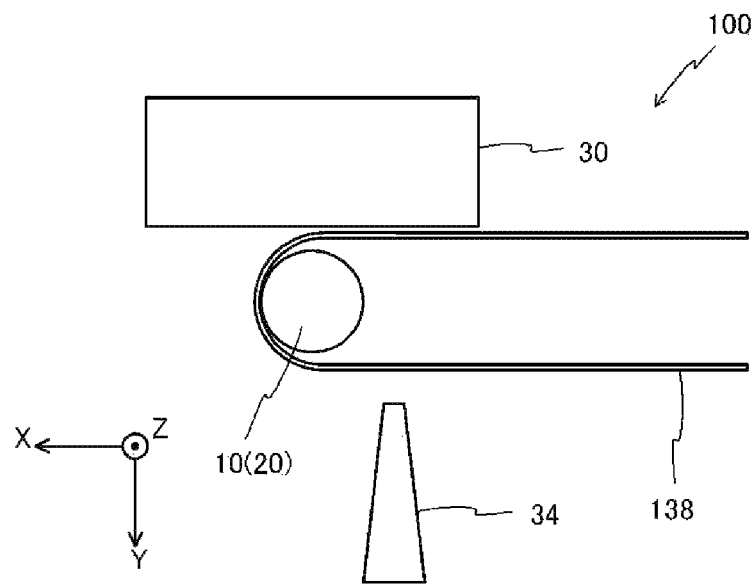
FIG. 9A and FIG. 9B are diagrams (No. 2) for describing another variation of the grafting device.

The above embodiment describes a case where two thermoplastic resin films are used, but does not intend to suggest any limitation. One thermoplastic resin film may be used. That is, the thermoplastic resin films 38A and 38B may be joined together at one end in the X-axis direction (see reference numeral 138 in FIG. 9A). In this case, the scion 10 and the rootstock 20 may be arranged between a first part and a second part that face each other when the thermoplastic resin film 138 is folded as illustrated in FIG. 9A (the U-shaped folded part as viewed from the Z-axis direction), and the thermoplastic resin film 138 may be welded by the ultrasonic welder 34 at a location near the scion 10 and the rootstock 20. This process allows grafting in short time and with less working step.

Figure 9B:
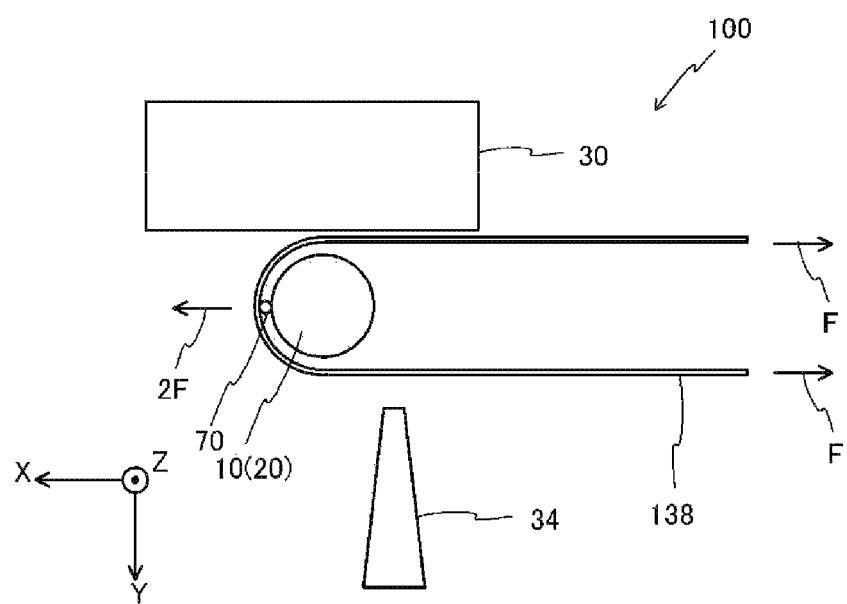

As illustrated in FIG. 9B, a rod-shaped tension member 70 may be located between the scion 10 and the rootstock 20 and the thermoplastic resin film 138, and a tensile load (2F) may be applied to the thermoplastic resin film 138 with use of the tension member 70. In this case, the tension member 70 may be removed by pulling out the tension member 70 after welding the thermoplastic resin film 138.

The above embodiment describes an exemplary case where the part to be ultrasonically welded is in a straight line (see the dashed line part in FIG. 4B), but does not intend to suggest any limitation. The part to be ultrasonically welded may be in a dotted line or a dashed line. Depending on the necessary adhesion strength, the shape and the dimensions of the part to be welded may be appropriately changed.

The above embodiment describes an exemplary case where a worker manually conducts a grafting operation, but does not intend to suggest any limitation. A part of or all of the grafting operation described in the above embodiment may be automatically conducted by a machine.

While the exemplary embodiments of the present invention have been illustrated in detail, the present invention is not limited to the above-mentioned embodiments, and other embodiments, variations and variations may be made without departing from the scope of the present invention.

The invention claimed is:

1. A grafting method comprising:
   making a cut surface of a scion and a cut surface of a rootstock contact with each other, and disposing separate sheet-like thermoplastic resin films facing each other across a contact part; and
   covering a periphery of the contact part with the thermoplastic resin films by ultrasonically welding the thermoplastic resin films together, wherein
      the covering includes ultrasonically welding the thermoplastic resin films while applying a predetermined tensile load in a direction intersecting with axis directions of the scion and the rootstock and a direction in which the thermoplastic resin films face each other.

2. The grafting method according to claim 1, wherein the disposing of the sheet-like thermoplastic resin films facing each other includes interposing the contact part between a first part and a second part that face each other when a single thermoplastic resin film is folded.

3. The grafting method according to claim 1, wherein the disposing of the sheet-like thermoplastic resin films facing each other includes interposing the contact part between two thermoplastic resin films facing each other.

4. The grafting method according to claim 1, wherein the disposing of the sheet-like thermoplastic resin films facing each other includes applying a predetermined tensile load in a direction intersecting with axis directions of the scion and the rootstock and a direction in which the thermoplastic resin films face each other, and the covering includes ultrasonically welding the thermoplastic resin films applied with the predetermined tensile load.

5. The grafting method according to claim 1, wherein the thermoplastic resin films are transparent.

6. A grafting method comprising:
   making a cut surface of a scion and a cut surface of a rootstock contact with each other, and disposing separate sheet-like thermoplastic resin films facing each other across a contact part; and
   covering a periphery of the contact part with the thermoplastic resin films by ultrasonically welding the thermoplastic resin films together, wherein
   the covering includes ultrasonically welding the thermoplastic resin films while applying a predetermined tensile load in a direction intersecting with axis directions of the scion and the rootstock and a direction in which the thermoplastic resin films face each other, and
   the thermoplastic resins films are joined together at one end in the direction the predetermined tensile load is applied.

7. The grafting method according to claim 6, wherein the disposing of the sheet-like thermoplastic resin films facing each other includes interposing the contact part between a first part and a second part that face each other when a single thermoplastic resin film is folded.

8. The grafting method according to claim 6, wherein the disposing of the sheet-like thermoplastic resin films facing each other includes interposing the contact part between two thermoplastic resin films facing each other.

9. The grafting method according to claim 6, wherein the disposing of the sheet-like thermoplastic resin films facing each other includes applying a predetermined tensile load in a direction intersecting with axis directions of the scion and the rootstock and a direction in which the thermoplastic resin films face each other, and the covering includes ultrasonically welding the thermoplastic resin films applied with the predetermined tensile load.

10. The grafting method according to claim 6, wherein the thermoplastic resin films are transparent.

* * * * *